US012659814B2

(12) United States Patent
Hong

(10) Patent No.: US 12,659,814 B2
(45) Date of Patent: Jun. 16, 2026

(54) INFORMATION SENDING METHOD, INFORMATION RECEIVING METHOD, APPARATUSES, DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 535 days.

(21) Appl. No.: 17/625,881

(22) PCT Filed: Jul. 10, 2019

(86) PCT No.: PCT/CN2019/095437
§ 371 (c)(1),
(2) Date: Jan. 10, 2022

(87) PCT Pub. No.: WO2021/003701
PCT Pub. Date: Jan. 14, 2021

(65) Prior Publication Data
US 2022/0264405 A1 Aug. 18, 2022

(51) Int. Cl.
*H04W 36/08* (2009.01)
*H04W 36/00* (2009.01)
(Continued)

(52) U.S. Cl.
CPC ... *H04W 36/0058* (2018.08); *H04W 36/0016* (2013.01); *H04W 36/0064* (2023.05);
(Continued)

(58) Field of Classification Search
CPC . H04W 80/04; H04W 36/18; H04W 36/0011; H04W 36/14; H04W 36/08;
(Continued)

(56) References Cited

U.S. PATENT DOCUMENTS 9,031,039 B2 * 5/2015 Hahn ..................... H04B 7/026
370/331
9,544,822 B2 * 1/2017 Dudda .............. H04W 36/0064
(Continued)

FOREIGN PATENT DOCUMENTS

CN 102340862 A * 2/2012 ............ H04W 56/00
CN 106454965 A * 2/2017 ............ H04W 36/00
(Continued)

*Primary Examiner* — Kevin T Bates
*Assistant Examiner* — Sanjay K Dewan
(74) *Attorney, Agent, or Firm* — Volpe Koenig

(57) ABSTRACT

An information sending method including: a source base station receives a measurement report of a target SIM card reported by a multi-card terminal, the multi-card terminal being a mobile terminal provided with at least two SIM cards, and the target SIM card being one of the at least two SIM cards; the source base station determines that the target SIM card needs to be handed over from a source cell to a target cell according to the measurement report; and in a process of handing over the multi-card terminal from the source cell to the target cell, the source base station sends multi-card information of the multi-card terminal to a target base station, the target base station being a base station providing the target cell, and the multi-card information including information related to the at least two SIM cards.

14 Claims, 3 Drawing Sheets

(51) Int. Cl.
*H04W 36/14* (2009.01)
*H04W 88/06* (2009.01)
(52) U.S. Cl.
CPC ........... *H04W 36/08* (2013.01); *H04W 36/14*
(2013.01); *H04W 88/06* (2013.01)
(58) Field of Classification Search
CPC ......... H04W 36/0058; H04W 36/0016; H04W
88/06
USPC ......................................................... 370/331
See application file for complete search history.

(56) References Cited

U.S. PATENT DOCUMENTS

| | | | | |
|---|---|---|---|---|
| 10,219,185 | B2 * | 2/2019 | Xu | H04W 36/0066 |
| 10,225,779 | B2 * | 3/2019 | Xu | H04W 36/30 |
| 10,681,590 | B2 * | 6/2020 | Sunell | H04W 8/22 |
| 11,323,943 | B2 * | 5/2022 | Lin | H04W 36/362 |
| 11,638,191 | B2 * | 4/2023 | Araujo | H04W 36/12 |
| | | | | 370/331 |
| 11,683,728 | B2 * | 6/2023 | Akdeniz | H04W 4/70 |
| | | | | 370/331 |
| 11,751,105 | B2 * | 9/2023 | Jin | H04W 60/04 |
| | | | | 370/331 |
| 11,843,941 | B2 * | 12/2023 | Yoo | H04W 24/10 |
| 2011/0026485 | A1 * | 2/2011 | Lin | H04W 36/08 |
| | | | | 370/331 |
| 2011/0045823 | A1 * | 2/2011 | Wang | H04W 12/062 |
| | | | | 455/424 |
| 2012/0020231 | A1 * | 1/2012 | Chen | H04W 36/302 |
| | | | | 370/252 |
| 2012/0202557 | A1 * | 8/2012 | Olofsson | H04W 36/0066 |
| | | | | 455/525 |
| 2012/0294275 | A1 * | 11/2012 | Krishnaswamy | |
| | | | | H04W 36/0064 |
| | | | | 370/331 |
| 2013/0308606 | A1 * | 11/2013 | Xu | H04W 36/0064 |
| | | | | 370/331 |
| 2015/0023319 | A1 * | 1/2015 | Park | H04W 36/0064 |
| | | | | 370/331 |
| 2015/0057046 | A1 * | 2/2015 | Challa | H04W 48/12 |
| | | | | 455/558 |
| 2015/0071249 | A1 * | 3/2015 | Hu | H04W 36/00224 |
| | | | | 370/331 |
| 2015/0105070 | A1 * | 4/2015 | Kotreka | H04W 48/17 |
| | | | | 455/434 |
| 2015/0131617 | A1 * | 5/2015 | Kitazoe | H04W 36/08 |
| | | | | 370/331 |
| 2015/0141017 | A1 * | 5/2015 | Krishnamoorthy | H04W 36/08 |
| | | | | 455/437 |
| 2015/0350969 | A1 * | 12/2015 | Dudda | H04W 36/0064 |
| | | | | 370/331 |
| 2015/0358869 | A1 * | 12/2015 | Byun | H04W 36/0009 |
| | | | | 370/331 |
| 2015/0382226 | A1 * | 12/2015 | Jung | H04W 24/10 |
| | | | | 370/252 |

| | | | | |
|---|---|---|---|---|
| 2016/0021584 | A1 * | 1/2016 | Zhang | H04W 36/305 |
| | | | | 370/331 |
| 2016/0044559 | A1 * | 2/2016 | Xu | H04W 36/08 |
| | | | | 370/331 |
| 2016/0174111 | A1 * | 6/2016 | Zhu | H04W 12/04 |
| | | | | 370/331 |
| 2016/0174232 | A1 * | 6/2016 | Krishnamoorthy | H04B 1/1027 |
| | | | | 455/452.2 |
| 2016/0302114 | A1 * | 10/2016 | Jain | H04W 36/304 |
| 2018/0063735 | A1 * | 3/2018 | Raghunathan | H04W 24/08 |
| 2018/0070303 | A1 * | 3/2018 | Tambaram Kailasam | |
| | | | | H04L 69/28 |
| 2018/0368031 | A1 * | 12/2018 | Tamura | H04W 36/0058 |
| 2019/0150052 | A1 * | 5/2019 | Wang | H04W 36/08 |
| | | | | 370/331 |
| 2019/0246323 | A1 * | 8/2019 | Kim | H04W 36/0058 |
| 2019/0261271 | A1 * | 8/2019 | Futaki | H04W 36/165 |
| 2019/0306768 | A1 * | 10/2019 | Kim | H04W 36/302 |
| 2020/0137755 | A1 * | 4/2020 | Lee | H04W 72/0453 |
| 2020/0178135 | A1 * | 6/2020 | Yun | H04W 36/0061 |
| 2020/0275340 | A1 * | 8/2020 | Kim | H04W 80/02 |
| 2021/0160748 | A1 * | 5/2021 | Jin | H04W 24/08 |
| 2021/0345152 | A1 * | 11/2021 | Kimba Dit Adamou | |
| | | | | H04W 24/02 |
| 2022/0015001 | A1 * | 1/2022 | Parichehrehteroujeni | |
| | | | | H04W 36/00837 |
| 2022/0086711 | A1 * | 3/2022 | Wang | H04W 36/249 |
| 2022/0141719 | A1 * | 5/2022 | Shan | H04W 36/26 |
| | | | | 370/331 |
| 2022/0141723 | A1 * | 5/2022 | Patankar | H04W 24/02 |
| | | | | 455/436 |
| 2022/0141736 | A1 * | 5/2022 | Muller | H04W 36/0016 |
| | | | | 370/331 |
| 2022/0141751 | A1 * | 5/2022 | Yao | H04W 28/0861 |
| | | | | 370/331 |
| 2022/0174616 | A1 * | 6/2022 | Hsieh | H04W 36/08 |
| 2022/0361132 | A1 * | 11/2022 | Gurumoorthy | H04W 60/005 |
| 2023/0116324 | A1 * | 4/2023 | Eklöf | H04W 24/10 |
| | | | | 370/331 |
| 2023/0262563 | A1 * | 8/2023 | Krishne Gowda | H04W 8/20 |
| | | | | 370/331 |
| 2023/0269647 | A1 * | 8/2023 | Ramachandra | H04W 36/0079 |
| | | | | 370/331 |

FOREIGN PATENT DOCUMENTS

| | | | | | |
|---|---|---|---|---|---|
| CN | 108419230 | A | * | 8/2018 | H04W 36/00 |
| CN | 108966296 | A | * | 12/2018 | H04B 17/318 |
| EP | 3 258 717 | A1 | * | 12/2017 | H04W 8/18 |
| GB | 2474077 | A | * | 10/2009 | H04W 36/08 |
| WO | WO 2012/061765 | A1 | * | 5/2012 | H04W 24/10 |
| WO | WO2014201689 | A | * | 12/2014 | H04W 8/18 |
| WO | WO2014201689 | A1 | * | 12/2014 | H04W 8/06 |
| WO | WO 2016/028447 | A1 | * | 2/2016 | H04W 48/18 |
| WO | WO 2020/122797 | A1 | * | 6/2020 | H04W 36/00 |
| WO | WO 2020/247043 | A1 | * | 12/2020 | H04W 48/14 |
| WO | WO 2022/130273 | A1 | * | 12/2022 | H04W 36/00 |
| WO | WO 2023/149716 | A1 | * | 8/2023 | H04W 8/24 |

* cited by examiner

INFORMATION SENDING METHOD, INFORMATION RECEIVING METHOD, APPARATUSES, DEVICE, AND STORAGE MEDIUM

CROSS REFERENCE TO RELATED APPLICATION

The present application is a U.S. National Phase of International Patent Application Serial No. PCT/CN2019/095437 filed on Jul. 10, 2019. The entire contents of the above-cited application are hereby incorporated by reference in their entirety for all purposes.

BACKGROUND

A multi-card terminal is a mobile terminal that can have two or more Subscriber Identity Modules (SIMs) installed at the same time. For example, a user installs a SIM card 1 for calls and a SIM card 2 for traffic in a multi-card terminal.

In the related technology, the SIM card 1 and the SIM card 2 work independently of each other. For example, when the multi-card terminal moves to the edge of a cell, the SIM card 1 performs a cell handover process, and accordingly, the SIM card 2 also performs the cell handover process.

The two SIM cards working independently of each other may consume additional power from the multi-card terminal.

SUMMARY

According to an aspect of the examples of the disclosure, provided is an information sending method applied to a source base station, the method including:

receiving a measurement report of a target SIM card reported by a multi-card terminal, the multi-card terminal being a mobile terminal provided with at least two SIM cards, and the target SIM card being one of the at least two SIM cards;

determining, according to the measurement report, that the target SIM card needs to be handed over from a source cell to a target cell, the source cell being a cell provided by the source base station; and in a process of handing over the multi-card terminal from the source cell to the target cell, sending multi-card information of the multi-card terminal to a target base station, the target base station being a base station providing the target cell, and the multi-card information including information related to the at least two SIM cards.

According to an aspect of the examples of the disclosure, provided is an information receiving method applied to a target base station, the method including:

in a process of handing over a multi-card terminal from a source cell to a target cell, receiving multi-card information of the multi-card terminal sent by a source base station, the source cell being a cell provided by the source base station, and the target cell being a cell provided by the target base station.

According to an aspect of the examples of the disclosure, provided is an access network device, the access network device including:

a processor; and a memory having an executable instruction stored therein, the processor being configured to load and execute the executable instruction to implement the information sending method and/or the information receiving method as described above.

According to an aspect of the examples of the disclosure, provided is a non-transitory computer-readable storage medium, the non-transitory computer-readable storage medium having an executable instruction stored therein, and the executable instruction being loaded and executed by a processor to implement the information sending method and/or the information receiving method as described above.

It should be understood that the above general description and the following detailed description are merely examples and illustrative, and do not limit the disclosure.

BRIEF DESCRIPTION OF THE DRAWINGS

In order to illustrate the technical solutions in the examples of the present application more clearly, a brief introduction to the drawings referenced for the examples will be provided below. As will be appreciated upon reading this disclosure, the drawings in the following description are merely some of the examples of the present application, and those of ordinary skill in the art would appreciate other drawings and representations could be derived from these drawings without any creative effort and without undue experimentation.

DETAILED DESCRIPTION

Examples will be illustrated in detail herein, and are shown in the figures. When the following description refers to the figures, the same numerals in different figures represent the same or similar elements unless otherwise indicated. The implementations described in the following examples do not represent all implementations consistent with the disclosure. Instead, they are merely examples of apparatuses and methods consistent with some aspects of the disclosure, as detailed in the appended claims.

The communication system and service scenarios described in the examples of the present application are intended to more clearly illustrate the technical solutions of the examples of the present application and do not constitute a limitation of the technical solutions provided by the examples of the present application. Those of ordinary skill in the art, upon reading this disclosure, would readily appreciate that the technical solutions provided by the examples of the present application are equally applicable to similar technical problems as the communication system evolves and new service scenarios emerge.

Figure 1:
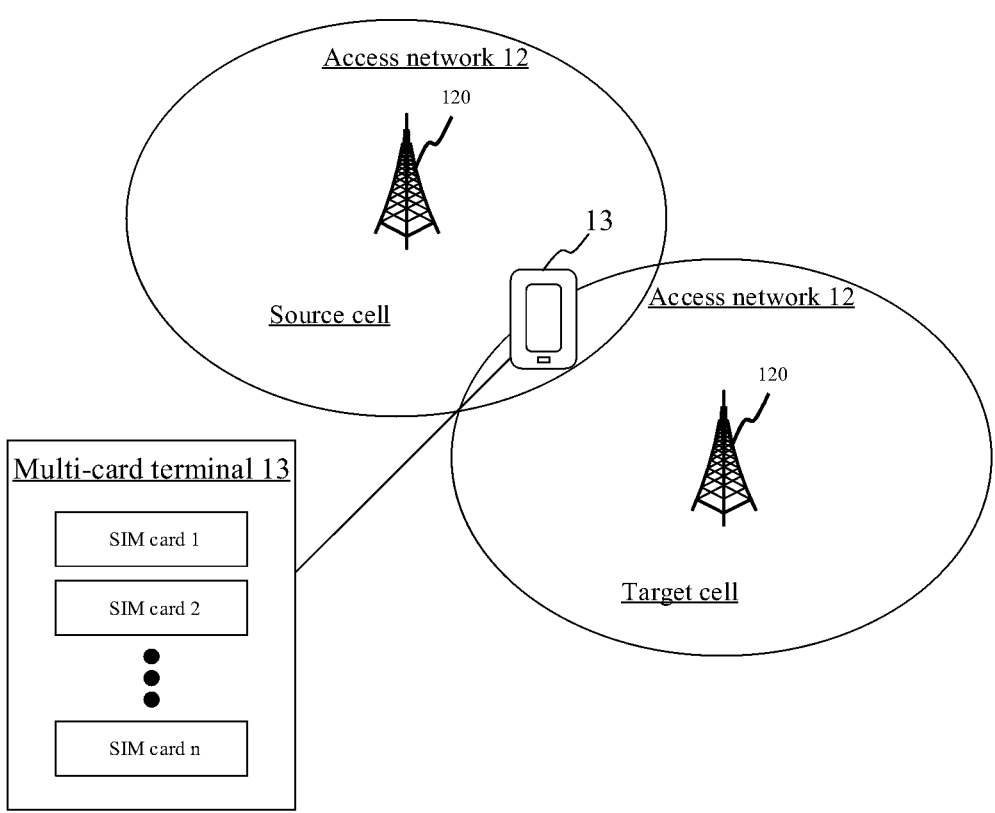
FIG. 1 is a structural block diagram of a communication system illustrated according to an example.

FIG. 1 illustrates a block diagram of a communication system provided in an example of the present application, and the communication system may include: an access network 12 and a terminal 13.

The access network 12 includes several access network devices 120. An access network device 120 may be a base station, the base station being an apparatus deployed in the access network to provide a wireless communication function for the terminal. The base station may include various forms of macro base stations, micro base stations, relay stations, access points, etc. In systems using different radio access techniques, the name of a device with a base station function may be different, for example, in an LTE system, the device is called an eNodeB or an eNB; and in a 5G NR system, the device is called a gNodeB or a gNB. As communications technology evolves, the description "base station" may change. For convenience in the examples of the present application, the apparatus providing a wireless communication function for the terminal 13 is collectively referred to as an access network device. For example, the access network device 120 includes: a source base station and a target base station.

The terminal 13 may include various handheld devices with a wireless communication function, an in-vehicle device, a wearable device, a computing device or other processing devices connected to a wireless modem, and various forms of User Equipments (UEs), Mobile Stations (MSs), terminal devices, etc. For convenience of description, the devices mentioned above are collectively referred to as a terminal. The access network device 120 and the terminal 13 communicate with each other by means of certain radio technology, such as a Uu interface.

The terminal 13 may be a multi-card terminal. The multi-card terminal is a mobile terminal with at least two SIM cards installed at the same time. The SIM card may be a SIM card in a hardware form or a SIM card in a software form, which is not limited in the disclosure. Each SIM may have its own International Mobile Equipment Identity (IMEI).

Taking the terminal 13 as an example of a multi-card mobile phone, typical application scenarios include the following:

I. A business user has a private SIM card and a business SIM card, and puts both SIM cards in a same mobile phone.

II. An ordinary user has multiple private SIM cards and may choose which SIM card to use according to a service.

These SIM cards may be from a same operator or from different operators.

At present, a processing method for a multi-card mobile phone is mainly based on the implementation of each terminal manufacturer, and there is no unified standard for regulation, thus leading to many different terminal behaviors and processing methods (such as dual card single standby, dual card dual standby single pass, and dual card dual standby dual pass). Assuming that a network system corresponding to a first SIM card is a first system and a network system corresponding to a second SIM card is a second system, the following problems may occur:

1. When communicating with the first system, a multi-card terminal needs to detect the second system periodically, such as monitoring paging, performing a measurement, and reading a system message. However, this may have an impact on the performance of the first system.

2. A paging moment is calculated according to an IMEI, and the multi-card terminal having a plurality of SIM cards may cause systematic paging collision.

3. When receiving a paging message on the second system, the multi-card terminal needs to determine whether the paging message needs to be responded to, which is performed on the basis of rules configured by a user.

4. When the multi-card terminal determines to respond to the paging message of the second system, the multi-card terminal needs to stop the work currently being performed in the first system. In the absence of a pending mechanism for the current activity, the multi-card terminal automatically disconnects the RRC connection to the first system and leaves. In addition, after a UE leaves, the first system keeps paging the UE, which leads to the waste of paging resources.

5. When the multi-card terminal reads the paging message or performs the signal quality measurement in the second system, a short interval of about 20 ms will be caused to the first system. For the first system, it is similar to experiencing shadow fading, but since it occurs once in each paging cycle, this may affect the power control and link adaptation algorithms of the network, and then causing a waste of resources in the first system.

6. When handover to the cell of the second system is decided, the multi-card terminal needs to read system information in the second system, which will cause a long interval of about is in the first system, and the first system will consider this as an error condition.

7. When the multi-card terminal performs Tracking Area Update (TAU) in the second system, this will cause a long interval of several seconds in the first system. So, the impact on the first system is greater.

For the above-mentioned problems 4, 5, 6 and 7, the multi-card terminal needs to disconnect the RRC connection on the first system. In other words, the current service of the multi-card terminal on the first system will be disconnected, and the RRC connection and service will be re-established when the multi-card terminal returns to the first system, consequently affecting the continuity of the service. In addition, the base station may continue to page the multi-card terminal after the multi-card terminal is disconnected from the first system, resulting in a waste of system resources. More importantly, the network may regard a short interval (tens of milliseconds) as a problem on the wireless side, but a longer interval will definitely be considered as an error condition. This can lead to incorrect guidance of the control algorithm, and can even lead to the failure of a wireless link and trigger a corresponding recovery mechanism. As a result, the autonomous behavior of the multi-card terminal may disrupt data statistics and related algorithms.

If the network can know that a certain UE is a multi-card terminal, and perform specific configuration for the multi-card terminal, such as the configuration of the TDM pattern, the above problems can be avoided. This requires the base station to know which UEs are multi-card UEs. A UE may report information that the UE is a multi-card UE to the network. However, a communication network in the related art regards different SIM cards in a multi-card terminal as different terminals, and the multiple SIM cards of the multi-card terminal also perform separate handover and separate cell selection/reselection. To address this, the examples of the present application are provided as follows.

Figure 2:
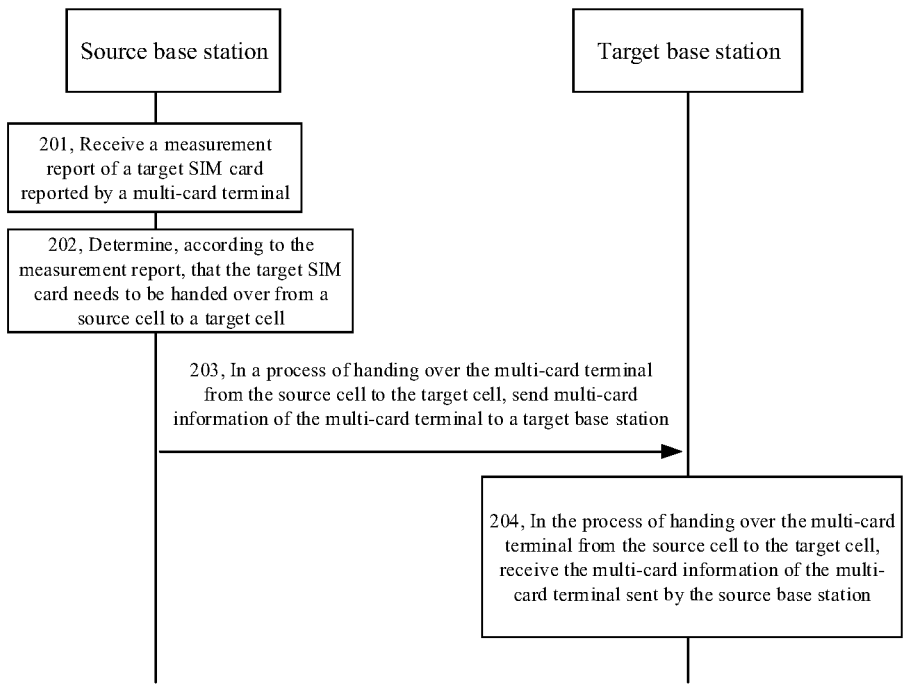
FIG. 2 is a flowchart of an information sending method illustrated according to an example.

FIG. 2 shows a flowchart of an information sending method provided by an example of the disclosure. The method may be applied to the communication system shown in FIG. 1, and the method includes the following steps:

Step 201: a source base station receives a measurement report of a target SIM card reported by a multi-card terminal.

The multi-card terminal is a mobile terminal provided with at least two SIM cards, and the target SIM card is one of the at least two SIM cards. For example, the target SIM card is a SIM card in an RRC connected state.

In one example, the at least two SIM cards are SIM cards all belonging to the same operator network.

Regarding the target SIM card, the multi-card terminal will measure the signal quality of a neighboring cell during movement, and when the signal quality meets a measurement report condition, the multi-card terminal sends a measurement report of the target SIM card to the source base station.

Step 202, the source base station determines, according to the measurement report, that the target SIM card needs to be handed over from a source cell to a target cell, the source cell being a cell provided by the source base station.

The source base station determines, according to the measurement report, whether the target SIM card needs a cell handover. When the measurement report meets a cell handover condition, it is determined that the target SIM card needs to perform the cell handover (that is, a handover from the source cell to the target cell); and when the measurement report does not meet the cell handover condition, it is determined that the target SIM does not need to perform the cell handover.

When the cell handover needs to be performed, the source base station instructs the multi-card terminal to perform the cell handover.

Step 203, in a process of handing over the multi-card terminal from the source cell to the target cell, the source base station sends multi-card information of the multi-card terminal to a target base station. The target base station is a base station providing the target cell, and the multi-card information includes information related to the at least two SIM cards.

Since the source cell is a camping cell of the multi-card terminal, the source base station stores information related to each SIM card on the multi-card terminal, that is, the multi-card information. At the same time, the source base station further stores information representing that the terminal is a multi-card terminal.

When the source base station determines that the terminal is a multi-card terminal, in the process of handing over the multi-card terminal from the source cell to the target cell, the source base station sends the multi-card information of the multi-card terminal to the target base station.

Step 204, in the process of handing over the multi-card terminal from the source cell to the target cell, the target base station receives the multi-card information of the multi-card terminal sent by the source base station.

For example, the target base station receives the multi-card information of the multi-card terminal sent by the source base station. The target base station can learn that the terminal is a multi-card terminal; in addition, the target base station can perform management and/or configuration according to the multi-card information of the multi-card terminal.

In summary, according to the method provided in the present example, when a cell handover process is executed on a target SIM card in a multi-card terminal, a source base station indicates multi-card information of the multi-card terminal to a target base station, such that the multi-card terminal does not need to report information of at least two SIM cards to the target base station again after cell handover, which reduces signaling overhead when the multi-card terminal needs to report information to the base station, saves power of the multi-card terminal, and improves endurance of the multi-card terminal.

Figure 3:
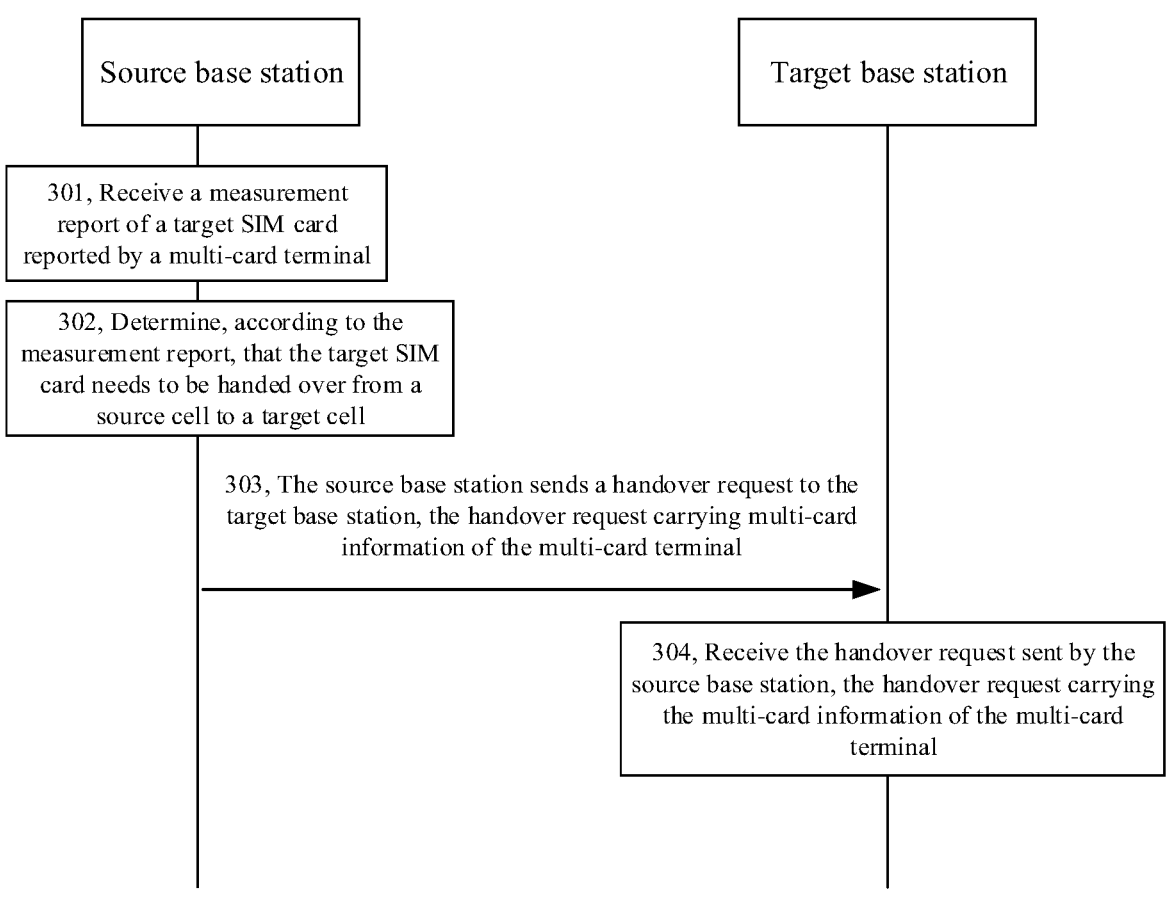
FIG. 3 is a flowchart of an information sending method illustrated according to another example.

FIG. 3 shows a flowchart of an information sending method provided by an example of the disclosure. The method may be applied to the communication system shown in FIG. 1, and the method includes the following steps:

Step 301: a source base station receives a measurement report of a target SIM card reported by a multi-card terminal.

The multi-card terminal is a mobile terminal provided with at least two SIM cards, and the target SIM card is one of the at least two SIM cards. For example, the target SIM card is a SIM card in an RRC connected state.

In one example, the at least two SIM cards are SIM cards all belonging to the same operator network.

Regarding the target SIM card, the multi-card terminal will measure the signal quality of a neighboring cell during movement, and when the signal quality meets a measurement report condition, the multi-card terminal sends a measurement report of the target SIM card to the source base station.

Step 302, the source base station determines, according to the measurement report, that the target SIM card needs to be handed over from a source cell to a target cell, the source cell being a cell provided by the source base station.

The source base station determines, according to the measurement report, whether the target SIM card needs a cell handover. When the measurement report meets a cell handover condition, it is determined that the target SIM card needs to perform the cell handover (that is, a handover from the source cell to the target cell); and when the measurement report does not meet the cell handover condition, it is determined that the target SIM does not need to perform the cell handover.

When the cell handover needs to be performed, the source base station instructs the multi-card terminal to perform the cell handover.

Step 303, the source base station sends a handover request to the target base station, the handover request carrying the multi-card information of the multi-card terminal.

The target base station is a base station providing the target cell, and the multi-card information includes information related to the at least two SIM cards.

In the process of handing over the multi-card terminal from the source cell to the target cell, the source base station needs to send a handover request (HR) to the target base station, the HR carrying the multi-card information of the multi-card terminal.

In an example, the multi-card information includes at least one of:

an IMEI of the multi-card terminal;

identity information corresponding to the at least two SIM cards, such as an IMSI corresponding to the at least two SIM cards, or an identity identifier assigned by a network side;

an RRC state in which the at least two SIM cards are located; and a TDM pattern configured for the at least two SIM cards.

Step 304, the target base station receives the handover request sent by the source base station, the handover request carrying the multi-card information of the multi-card terminal.

For example, the target base station receives the HR sent by the source base station, and reads the multi-card information of the multi-card terminal from the HR. The target base station can learn that the terminal is a multi-card terminal; in addition, the target base station can perform management and/or configuration according to the multi-card information of the multi-card terminal.

In an example, the multi-card information includes at least one of:

an IMEI of the multi-card terminal;

identity information corresponding to the at least two SIM cards, such as an IMSI corresponding to the at least two SIM cards, or an identity identifier assigned by a network side;

an RRC state in which the at least two SIM cards are located; and a TDM pattern configured for the at least two SIM cards.

In summary, according to the method provided in the present example, when a cell handover process is executed on a target SIM card in a multi-card terminal, a source base station indicates multi-card information of the multi-card terminal to a target base station, such that the multi-card terminal does not need to report information of at least two SIM cards to the target base station again after cell handover, which reduces signaling overhead when the multi-card terminal needs to report information to the base station, saves power of the multi-card terminal, and improves endurance of the multi-card terminal.

Figure 4:
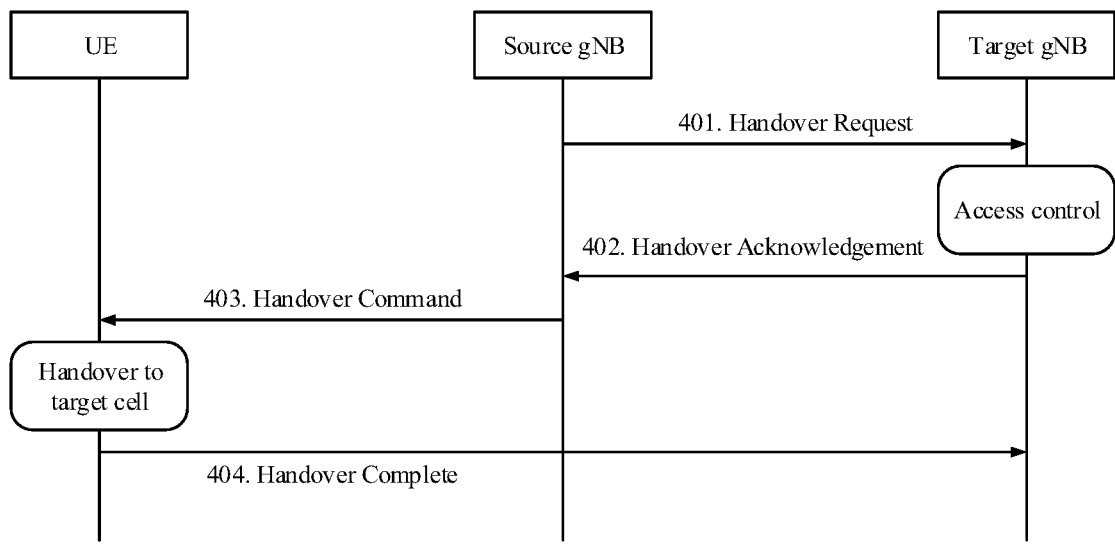
FIG. 4 is a flowchart of a cell handover method illustrated according to another example.

FIG. 4 shows a flowchart of a cell handover method provided by an example of the disclosure. The method may be applied to the communication system shown in FIG. 1. The present example is illustrated by taking the source base station as a source gNB, taking the target base station as a target gNG, and taking the multi-card terminal as a UE. The method includes the following steps:

Step 401, a source gNB initiates a handover, and sends a handover request (HR) through an Xn interface.

The handover request carries multi-card information of a multi-card terminal.

In an example, the handover request is sent by a source NG-RAN node to a target NG-RAN node, requesting to prepare resources for the handover. Direction: the source NG-RAN node→the target NG-RAN node.

Step 402, a target gNB executes access control and provides an RRC configuration as part of handover acknowledgement.

Step 403, the source gNB provides the RRC configuration to a UE in a handover command.

A handover command message at least includes a cell ID and all information needed to access a target cell, such that the UE may access the target cell without reading system information.

In some cases, information required for contention-based and contention-free random access may be included in the handover command message. The access information to the target cell may include beam specific information (if any).

Step 404, the UE moves an RRC connection to the target gNB and replies to the completion of the handover.

A handover mechanism triggered by RRC requires the UE to at least reset a Medium Access Control (MAC) entity and re-establish Radio Link Control (RLC). RRC management handover with and without Packet Data Convergence Protocol (PDCP) entity reconstruction is supported. For a DRB that uses an RLC AM mode, the PDCP can be re-established together with a security key change, or the data recovery process can be initiated without changing the key. For a Data Radio Bearer (DRB) that uses an RLC UM mode and a Signaling Radio Bearer (SRB), the PDCP can either be re-established together with the security key change, or remain unchanged without changing the key. When the target gNB uses the same DRB configuration as the source gNB, data transmission during handover, sequential transmission and copy avoidance can be guaranteed. NR supports a timer-based handover failure process. The RRC connection re-establishment process is used to recover from a handover failure.

In summary, according to the method provided in the present example, when a cell handover process is executed on a target SIM card in a multi-card terminal, a source base station indicates multi-card information of the multi-card terminal to a target base station, such that the multi-card terminal does not need to report information of at least two SIM cards to the target base station again after cell handover, which reduces signaling overhead when the multi-card terminal needs to report information to the base station, saves power of the multi-card terminal, and improves endurance of the multi-card terminal.

In the above examples, the steps executed by the source base station may be implemented as an information sending method at a source base station side, and the steps executed by the target base station may be implemented as an information receiving method at a target base station side.

Figure 5:
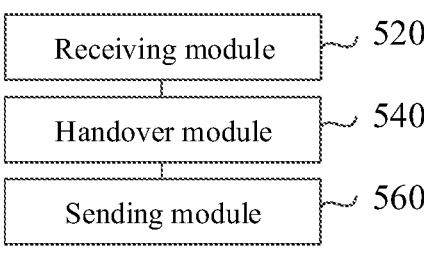
FIG. 5 is a block diagram of a source access network apparatus illustrated according to another example.

FIG. 5 shows a block diagram of a source access network apparatus provided by an example of the present application. The apparatus may be implemented as all or part of a source base station by means of software, hardware or a combination of the two. The apparatus includes:

a receiving module 520 configured to receive a measurement report of a target SIM card reported by a multi-card terminal, the multi-card terminal being a mobile terminal provided with at least two SIM cards, and the target SIM card being one of the at least two SIM cards;

a handover module 540 configured to determine, according to the measurement report, that the target SIM card needs to be handed over from a source cell to a target cell, the source cell being a cell provided by the source access network apparatus; and a sending module 560 configured to, in a process of handing over the multi-card terminal from the source cell to the target cell, send multi-card information of the multi-card terminal to a target access network apparatus, the target access network apparatus being an access network apparatus providing the target cell, and the multi-card information including information related to the at least two SIM cards.

In an optional example, the sending module 560 is configured to send a handover request (HR) to the target access network apparatus, the handover request carrying the multi-card information of the multi-card terminal.

In an optional example, the target SIM card is a SIM card in a radio resource control connected state.

In an optional example, the multi-card information includes at least one of:

an IMEI of the multi-card terminal;

identity information corresponding to the at least two SIM cards, such as an IMSI corresponding to the at least two SIM cards, or an identity identifier assigned by a network side;

an RRC state in which the at least two SIM cards are located; and a TDM pattern configured for the at least two SIM cards.

Figure 6:
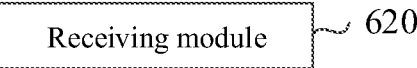
FIG. 6 is a block diagram of a target access network apparatus illustrated according to another example.

FIG. 6 shows a block diagram of a target access network apparatus provided by an example of the present application. The apparatus may be implemented as all or part of a target base station by means of software, hardware or a combination of the two. The apparatus includes:

a receiving module 620 configured to, in a process of handing over a multi-card terminal from a source cell to a target cell, receive multi-card information of the multi-card terminal sent by a source access network apparatus, the source cell being a cell provided by the source access network apparatus, and the target cell being a cell provided by the target access network apparatus.

In an optional example, the receiving module 620 is configured to receive a handover request (HR) sent by the source access network apparatus, the handover request carrying the multi-card information of the multi-card terminal.

In an optional example, the target SIM card is a SIM card in a radio resource control connected state.

In an optional example, the multi-card information includes at least one of:

an IMSI of the multi-card terminal;

identity information corresponding to the at least two SIM cards, such as an IMSI corresponding to the at least two SIM cards, or an identity identifier assigned by a network side;

an RRC state in which the at least two SIM cards are located; and a TDM pattern configured for the at least two SIM cards.

Figure 7:
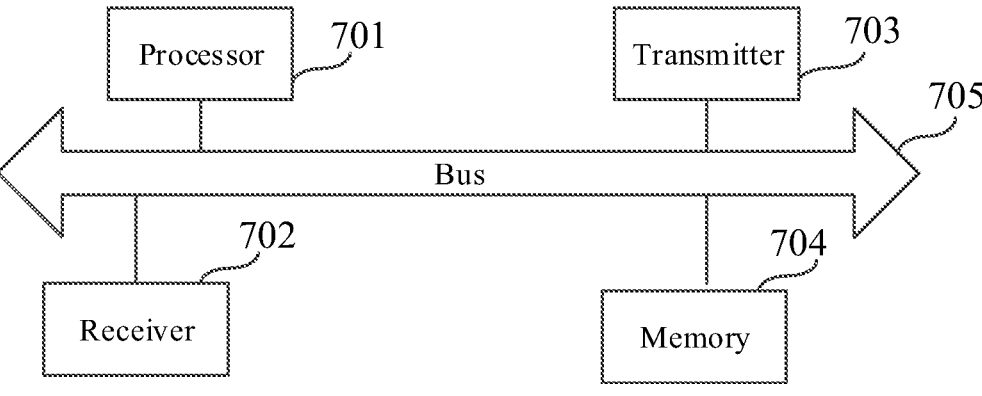
FIG. 7 is a schematic structural diagram of an access network device illustrated according to an example.

FIG. 7 shows a schematic structural diagram of an access network device provided by an example of the disclosure. The access network device includes: a processor 701, a receiver 702, a transmitter 703, a memory 704 and a bus 705.

The processor 701 includes one or more processing cores. The processor 701 executes various functional applications and information processing by running software programs and modules.

The receiver 702 and the transmitter 703 may be implemented as one communication component which may be a communication chip.

The memory 704 is connected to the processor 701 by means of the bus 705.

The memory 704 may be used for storing at least one instruction, and the processor 701 is used for executing the at least one instruction to implement the steps in the foregoing method examples.

In addition, the memory 704 may be implemented by any type of volatile or non-volatile storage device or a combination of them. The volatile or non-volatile storage device includes, but is not limited to: a magnetic disk or an optical disk, an electrically erasable programmable read only memory (EEPROM), an erasable programmable read only memory (EPROM), a static random access memory (SRAM), a read only memory (ROM), a magnetic memory, a flash memory and a programmable read only memory (PROM).

In an example, further provided is a non-transitory computer-readable storage medium including processor-executable instructions, such as a memory including an instruction, which may be executed by a processor of an access network device to carry out the foregoing information sending method. For example, the non-transitory computer-readable storage medium may be an ROM, a random access memory (RAM), a CD-ROM, a magnetic tape, a floppy disk, an optical data storage device, etc.

Provided is a non-transitory computer-readable storage medium, and when an instruction in the non-transitory computer storage medium is executed by a processor of an access network device, the access network device can execute the foregoing information sending method and/or the information receiving method.

An example of the disclosure further provides a computer-readable storage medium. At least one instruction, at least one segment of program, a code set or an instruction set is stored in the computer-readable storage medium. The at least one instruction, the at least one segment of program, the code set or the instruction set is loaded and executed by a processor to implement the information sending method and/or the information receiving method provided by the foregoing method examples.

It should be understood that the "plurality" mentioned herein refers to two or more. The wording "and/or" describes the association relationship of the associated objects, and indicates that three relationships may exist, for example, A and/or B may indicate: A exists alone, A and B exist simultaneously, and B exists alone. The character "/" generally indicates that the former and latter associated objects are in an "or" relationship.

Other examples of the disclosure would readily occur to a person skilled in the art after considering the description and the practical examples disclosed herein. The present disclosure is intended to cover any variation, use or adaptation change of the present disclosure, which is in accordance with the general principles of the present disclosure and includes common general knowledge or customary technical means in the art which are not disclosed in the present disclosure. The description and examples are to be regarded as illustrative only, and the true scope and spirit of the disclosure are pointed out by the following claims.

It should be understood that the disclosure is not limited to the precise structures described above and shown in the accompanying drawings, and various modifications and changes may be made without departing from the scope of the disclosure. The scope of the disclosure is merely limited by the appended claims.

What is claimed is:

1. A method for sending information performed by a source base station, the method comprising:

receiving a measurement report of a target Subscriber Identity Module (SIM) card reported by a multi-card terminal, wherein the multi-card terminal is a mobile terminal provided with at least two SIM cards, and the target SIM card is one of the at least two SIM cards, wherein the measurement report of the target SIM card is sent to the source base station when a signal quality of a neighboring cell measured by the multi-card terminal during movement meets a measurement report condition;

determining, according to the measurement report, that the target SIM card needs to be handed over from a source cell to a target cell, wherein the source cell is a cell provided by the source base station;

in a process of handing over the multi-card terminal from the source cell to the target cell, sending multi-card information of the multi-card terminal to a target base station to enable the target base station to identify the multi-card terminal and perform at least one of management or configuration according to the multi-card information, wherein the target base station is a base station providing the target cell, and the multi-card information comprises information related to the at least two SIM cards; and in the process of handing over the multi-card terminal from the source cell to the target cell, providing an RRC configuration to the multi-card terminal in a handover command message, wherein the handover command message at least includes a cell ID and all information needed to access the target cell, and the handover command message is used for the multi-card terminal to access the target cell without reading system information;

wherein the multi-card information comprises at least one of:

an International Mobile Equipment Identity (IMEI) of the multi-card terminal;

identity information corresponding to the at least two SIM cards;

a Radio Resource Control (RRC) state in which the at least two SIM cards are located; or a Time-Division Multiplexing (TDM) pattern configured for the at least two SIM cards.

2. The method according to claim 1, wherein the sending multi-card information of the multi-card terminal to the target base station comprises:

sending a handover request to the target base station, wherein the handover request carries the multi-card information of the multi-card terminal.

3. The method according to claim 1, wherein the target SIM card is a SIM card in a radio resource control connected state.

4. A non-transitory computer-readable storage medium, storing executable instructions, the executable instructions when executed by a processor of the source base station, cause the source base station to perform the method of claim 1.

5. A method for receiving information performed by a target base station, the method comprising:

in a process of handing over a multi-card terminal from a source cell to a target cell, receiving multi-card information of the multi-card terminal sent by a source base station, wherein the handing over of the multi-card terminal from the source cell to the target cell is determined by the source base station based on a measurement report received from the multi-card terminal, and the measurement report is sent to the source base station when a signal quality of a neighboring cell measured by the multi-card terminal during movement meets a measurement report condition;

identifying the multi-card terminal and performing at least one of management or configuration according to the multi-card information; and in the process of handing over the multi-card terminal from the source cell to the target cell, executing access control and providing an RRC configuration as a part of handover acknowledgement wherein the source cell is a cell provided by the source base station, and the target cell is a cell provided by the target base station;

wherein the multi-card information comprises at least one of:

an International Mobile Equipment Identity (IMEI) of the multi-card terminal;

identity information corresponding to at least two Subscriber Identity Module (SIM) cards of the multi-card terminal;

a Radio Resource Control (RRC) state in which the at least two SIM cards are located; or a Time-Division Multiplexing (TDM) pattern configured for the at least two SIM cards.

6. The method according to claim 5, wherein receiving the multi-card information of the multi-card terminal sent by the source base station comprises:

receiving a handover request (HR) sent by the source base station, wherein the handover request carries the multi-card information of the multi-card terminal.

7. The method according to claim 5, wherein a target SIM card among the at least two SIM cars is a SIM card in a radio resource control connected state.

8. An access network device, the access network device comprising:

a processor; and a memory, the memory having executable instructions stored therein, wherein the executable instructions when executed by the processor cause the access network device to act as the target base station and perform the method of claim 5.

9. The access network device according to claim 8, wherein the executable instructions further cause the access network device to:

receive a handover request (HR) sent by the source base station, wherein the handover request carries the multi-card information of the multi-card terminal.

10. The access network device according to claim 8, wherein a target SIM card among the at least two SIM cards is a SIM card in a radio resource control connected state.

11. A non-transitory computer-readable storage medium, storing executable instructions, the executable instructions when executed by a processor of the target base station cause the target base station to perform the method of claim 5.

12. An access network device, the access network device comprising:

a processor; and a memory, the memory having executable instructions stored therein, wherein the processor is configured to:

receive a measurement report of a target Subscriber Identity Module (SIM) card reported by a multi-card terminal, wherein the multi-card terminal is a mobile terminal provided with at least two SIM cards, and the target SIM card is one of the at least two SIM cards, wherein the measurement report of the target SIM card is sent to a source base station when a signal quality of a neighboring cell measured by the multi-card terminal during movement meets a measurement report condition;

determine, according to the measurement report, that the target SIM card needs to be handed over from a source cell to a target cell, wherein the source cell is a cell provided by source base station;

in a process of handing over the multi-card terminal from the source cell to the target cell, send multi-card information of the multi-card terminal to a target base station to enable the target base station to identify the multi-card terminal and perform at least one of management or configuration according to the multi-card information, wherein the target base station is a base station providing the target cell, and the multi-card information comprises information related to the at least two SIM cards; and in the process of handing over the multi-card terminal from the source cell to the target cell, provide an RRC configuration to the multi-card terminal in a handover command message, wherein the handover command message at least includes a cell ID and all information needed to access the target cell, and the handover command message is used for the multi-card terminal to access the target cell without reading system information;

wherein the multi-card information comprises at least one of:

an International Mobile Equipment Identity (IMEI) of the multi-card terminal;

identity information corresponding to at least two SIM cards of the multi-card terminal;

a Radio Resource Control (RRC) state in which the at least two SIM cards are located; or a Time-Division Multiplexing (TDM) pattern configured for the at least two SIM cards.

13. The access network device according to claim 12, wherein the processor is further configured to load and execute the executable instructions to send a handover request to the target base station, wherein the handover request carries the multi-card information of the multi-card terminal.

14. The access network device according to claim 12, wherein the target SIM card is a SIM card in a radio resource control connected state.

* * * * *